J. HARDING, Jr.
CLUTCH MECHANISM.
APPLICATION FILED JAN. 7, 1907.

972,693.

Patented Oct. 11, 1910.

4 SHEETS—SHEET 1.

Witnesses:
Robert T. Frazier

Inventor:
John Harding, Jr.
by Smith & Frazier
his Attys.

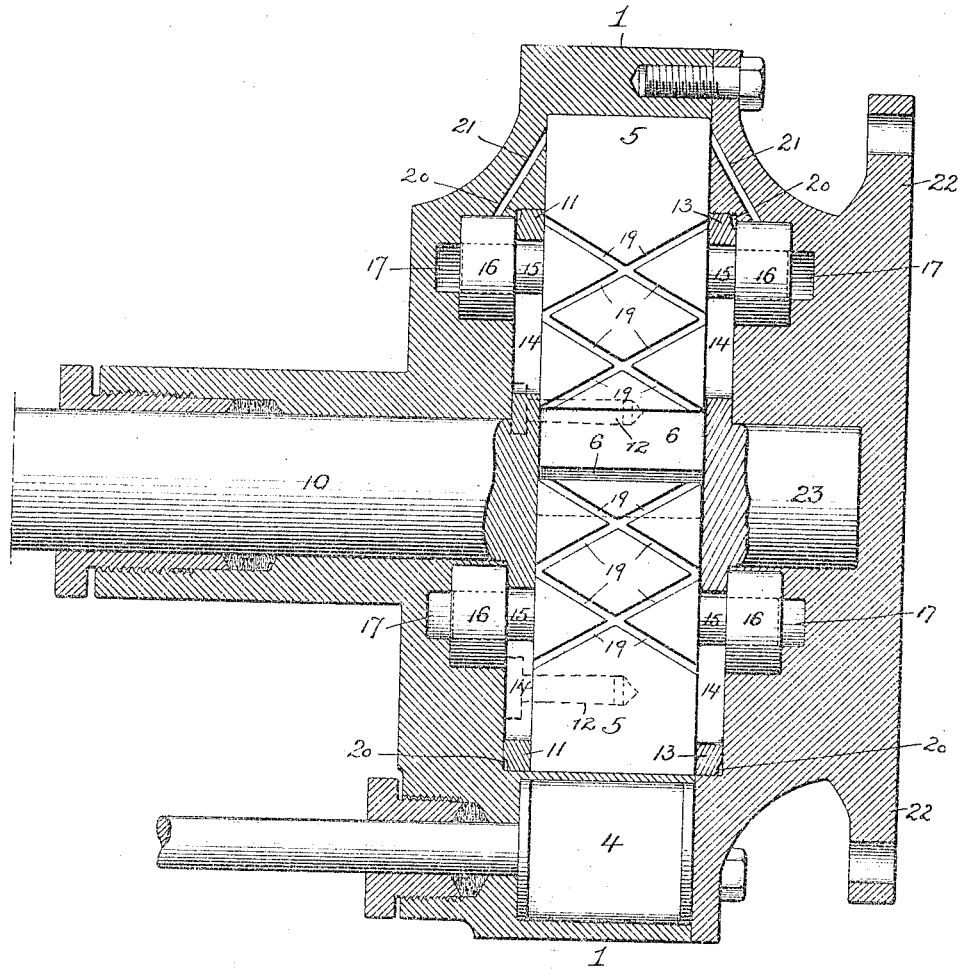

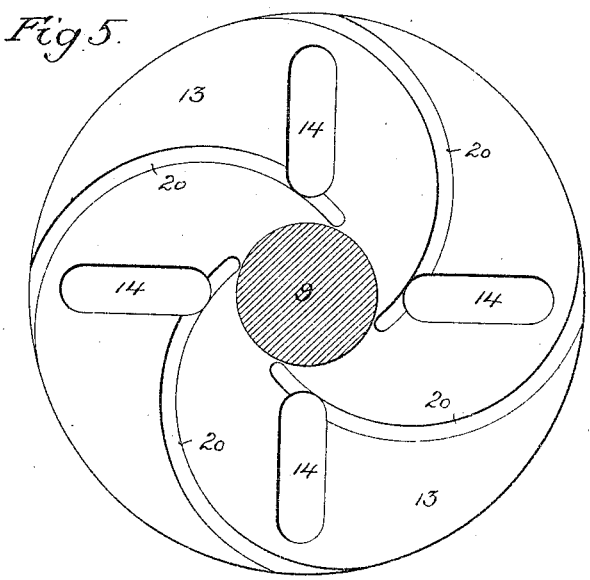
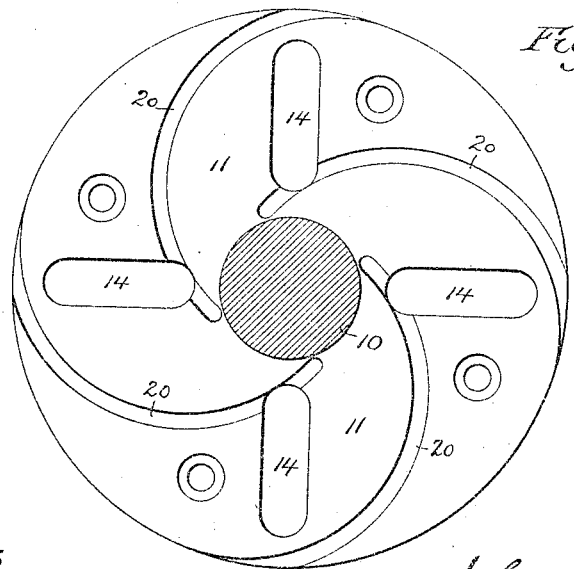

UNITED STATES PATENT OFFICE.

JOHN HARDING, JR., OF NASHVILLE, TENNESSEE, ASSIGNOR TO JOHN E. LANDIS, OF NASHVILLE, TENNESSEE.

CLUTCH MECHANISM.

972,693.  Specification of Letters Patent.  Patented Oct. 11, 1910.

Application filed January 7, 1907.  Serial No. 351,232.

*To all whom it may concern:*

Be it known that I, JOHN HARDING, Jr., a citizen of the United States, residing in Nashville, Tennessee, have invented certain Improvements in Clutch Mechanism, of which the following is a specification.

My invention consists of certain improvements in the clutch mechanism forming the subject of my Letters Patent No. 802,688, dated Oct. 24, 1905, the purpose of my present invention being to increase the field of usefulness of the clutch and to improve the operation of the same in certain respects, all as fully hereinafter set forth.

Figure 1:
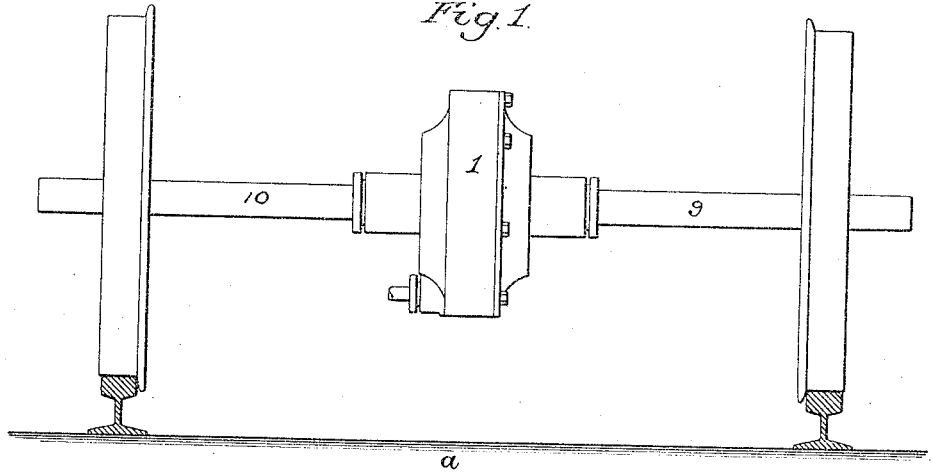
Figure 2:
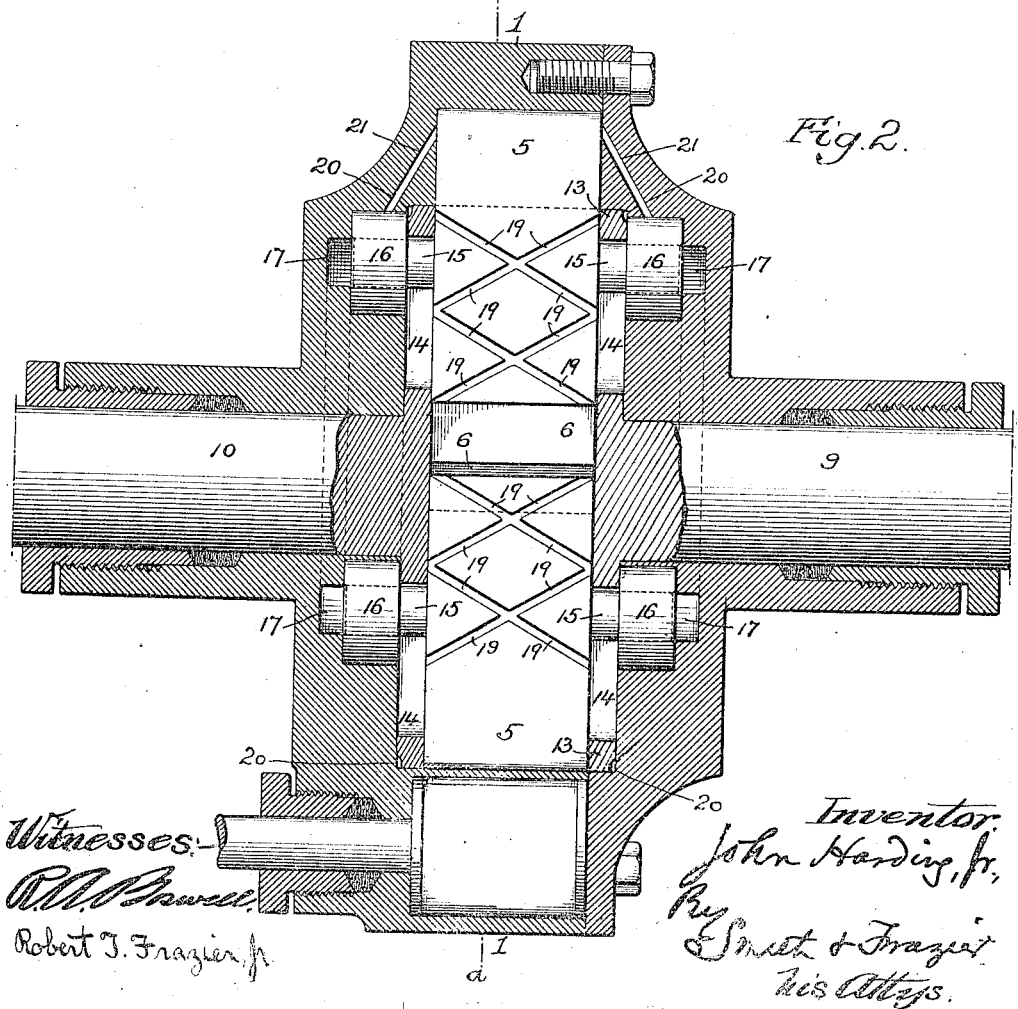
Figure 3:
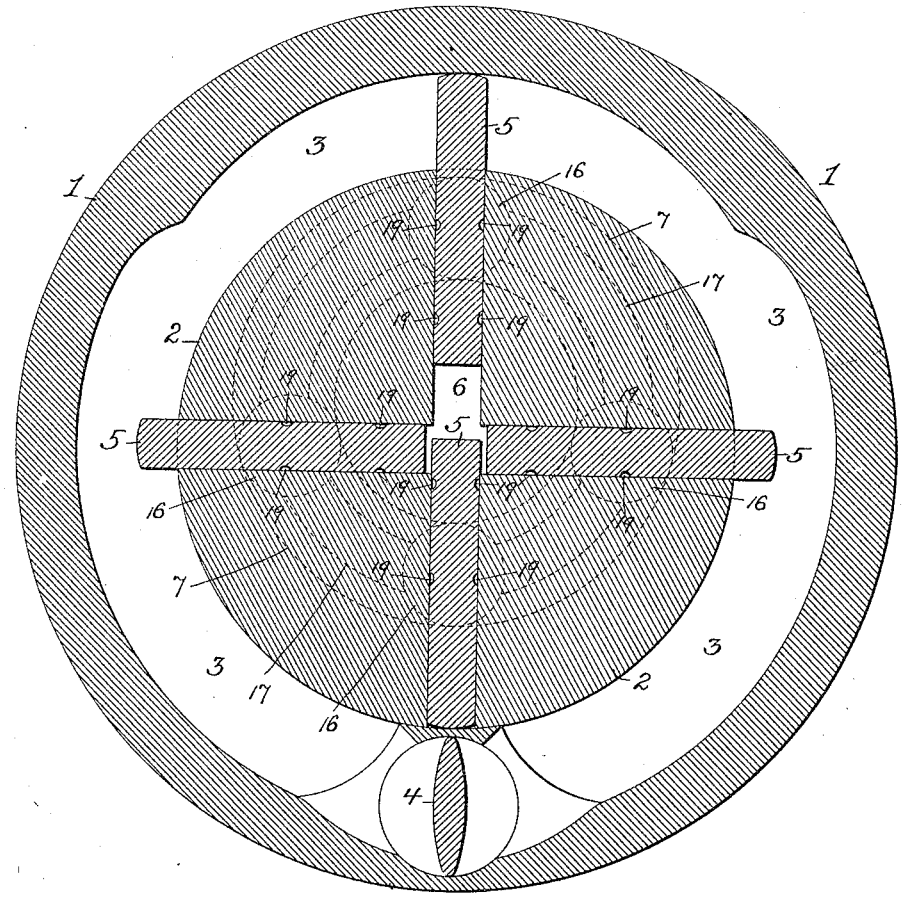
Figure 7:
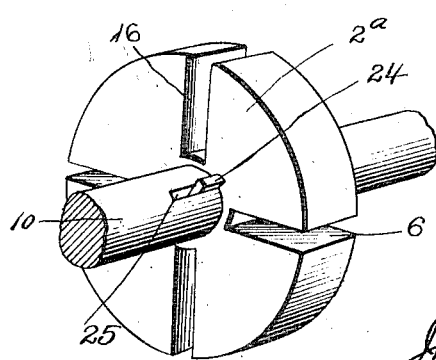

In the accompanying drawings, Figure 1 is a side elevation illustrating one of the uses for which my improved form of clutch has been designed; Fig. 2 is a view of the clutch partly in longitudinal section and partly in elevation; Fig. 3 is a transverse section on the line *a—a*, Fig. 2; Fig. 4 is a view similar to Fig. 2, but illustrating certain modifications of the invention; Fig. 5 is a view of either end of the "core" of the clutch shown in Fig. 4; and Fig. 6 is a view of the left hand end of the core, shown in Fig. 4; and Fig. 7 is a detail of a further modification.

The clutch shown in my before-mentioned patent comprised, essentially, a casing 1 mounted so as to be free to rotate and containing a rotatable core 2 between whose outer periphery and the inner periphery of the annular casing 1 intervened a "liquid circuit" 3 whose continuity could be either wholly or partially obstructed by means of a valve 4 located at one point therein, the clutching together of the core and casing being effected by the projection into the liquid circuit of the outer ends of certain sliding vanes or blades 5 guided in radial slots 6 in the core 2, and projected and retracted in these guides by means of shoes pivotally mounted upon the vanes and engaging annular grooves 7 formed in the casing and eccentric in respect to the axis of rotation of the annular casing and core.

In the patented clutch the annular casing was carried by one shaft member, and the core by another shaft member in line axially with the first, and the core shaft had but a single bearing in one side of the surrounding casing, the opposite face of the core bearing against the flat inner face of the opposite side of the casing which was connected to the shaft member of the casing and was detachably secured to the main portion of the casing in order to permit access to the interior of the latter.

One of the objects of my present invention is to provide a bearing for the core in each side of the surrounding casing in order to increase the strength, stability and true running of this member of the clutch, and, in special cases, to make the core, either actually or in effect, part of a shaft or axle which projects from both sides of the casing, as, for instance, in the case of the car axle shown in Fig. 1, whereby when rotative movement is imparted to the casing 1, either by means of a belt, an endless chain, or gearing from a suitably rotated motor, such movement can be imparted to a wheel, pulley, or equivalent device at each end of said shaft or axle.

In Fig. 4 of the drawing 10 and 23 represent the two members of the shaft or axle, the member 23 being, by preference, integral with the core, but the member 10 having formed upon it a face plate 11, which forms one of the side walls of the core and is rigidly secured to the latter by means of screw bolts 12, or equivalent fastenings, preferably of a detachable character, the provision of the core with a detachable face plate or side wall of this character being preferred for the reason that it permits of the formation of the radial slots in the core by milling, and therefore more easily than if said slots had to be formed by mortising through a solid core.

Both the detachable end wall 11 and the integral wall 13 of the core have formed in them slots 14 coincident with the radial slots 6 and intended for the passage of the pins 15 which project from the opposite sides of the vanes 5 and carry anti-friction rollers 16 which travel in the grooves 7 and serve the same purpose as the shoes of the patented clutch in effecting projection and retraction of the vanes 5.

As explained in my former patent, the rollers 16 at each side of the core change their relations to one another as they traverse the groove 7, and as the groove is filled with oil or other liquid some means must be provided for permitting it to flow from one part of the groove to another. In the patented clutch the shoes were grooved for this purpose, but in order to obviate the necessity of grooving the rollers 16 and thereby decreasing the area of the bearing surface of each roller, I provide each of the grooves 7 with a sub-groove 17, which at all times provides communication from one part of said groove 7 to another past the rollers 16.

The sliding vanes 5 have in each of their front and rear contact faces communicating grooves 19 which receive oil or other liquid from the liquid circuit 3, and convey it to the adjoining walls of the radial slots 6 in order to lubricate the latter and facilitate the sliding movement of the vanes, and curved grooves 20 are, as shown in Figs. 5 and 6, formed in the outer faces of the side walls 11 and 13 of the core for the purpose of conveying liquid lubricant to the adjoining contact faces of the casing, whereby rotative movement of the core and casing in respect to one another is facilitated when the clutch is working under those conditions.

In order to insure a proper supply of oil or other liquid to the grooves 7 and 17, passages 21, Figs. 2 and 4, serve to place said grooves 7 in communication with the liquid circuit 3 of the casing, and likewise serving to balance the pressure on the opposite end of the vanes. Again, should the groove 7, rollers 16, or pivots 15, wear sufficiently to produce appreciable lost motion in the sliding vane, the liquid having access to the inner ends of the vanes through said grooves 21, will insure outward radial movement of the vanes.

Certain of the elements of my invention may be employed with advantage in that type of clutch in which the casing 1 is carried by one shaft member, and the core 2 is carried by the other shaft member, thus in Fig. 4 the detachable side of the casing 1 has formed upon it a face plate 22 for attachment to a like plate on the driving shaft or the shaft to be driven, the core 2 in this case having a short stub shaft 23 adapted to a bearing in said detachable side of the casing, thereby preserving the advantages of the opposite bearings for the core and the opposite end walls for stiffening and strengthening the core and insuring the better guidance of the sliding vanes 5 therein.

In Fig. 7, I have shown a further modification, specially adapted for use when continuous shafting or axles are desirable or used. In this form, the shaft 10 is continuous, and the core or body 2ª is separable therefrom, and secured thereto by suitable means, such as a spline or keys 24 and grooves 25. This construction, it will be noted, possesses the advantage of avoiding the mortising or cutting through the shaft or axle.

In the embodiment of my invention, Fig. 2 where the two members 9 and 10 of the shaft are continuous, I have shown one of the side walls of the core as integral with the shaft 10, but either or both of said side walls may be detachable from the central portion or body of the core, if desired.

It is obvious that either member of my clutch may be the driver or driving member, and each may impart motion in the same or reverse directions.

I claim:

1. The combination, in a clutch, of a casing having internal grooves in its opposite sides, a core mounted in said casing on an axis eccentric in respect to the axis of said grooves, opposite slotted end walls on said core, vanes guided in slots in the core and having connection with propelling members contained in the grooves of the casing, a liquid circuit intervening between the core and the casing, and means for regulating the flow of the liquid therethrough.

2. The combination, in a clutch, of a slotted core having sliding vanes therein, propelling members connected to said vanes, a casing having grooves eccentric in respect to the axis of the core for receiving said members, and sub-grooves for the flow of liquid past the latter.

3. The combination, in a clutch, of a casing, a core mounted therein so as to provide a liquid circuit between the two, means for regulating the flow of liquid therethrough, vanes mounted in said core and having liquid-conveying grooves in their front and rear faces, and means for advancing and retracting said vanes.

4. The combination, in the clutch, of a casing, a core mounted therein so as to form a liquid circuit between the two, means for regulating the flow of liquid therein, an end wall of the core in contact with the casing and having liquid-conveying grooves formed in it, sliding vanes in the core, and means for advancing and retracting said vanes.

5. The combination, in a clutch, of a casing, a slotted core disposed therein so as to form a liquid circuit between the two, means for regulating the flow of liquid therein, an end wall detachably secured to the core, vanes slidably mounted in said core, and means for advancing and retracting said vanes.

6. The combination, in a clutch, of a casing, a core mounted therein so as to form a liquid circuit between the two, means for regulating the flow of liquid therein, end walls, one integral with said core and the other detachably connected thereto, vanes slidably mounted in the slotted core, and means for advancing and retracting said vanes.

7. The combination, in a clutch, of a core having sliding vanes therein, a casing providing a liquid circuit between itself and the core and having grooves eccentric in respect to the axis of the core, vane-propelling members guided in said grooves, and passages connecting said grooves with the liquid circuit.

In testimony whereof, I have signed my name to this specification, in the presence of two subscribing witnesses.

JOHN HARDING, Jr.

Witnesses:
J. ROY BOONE,
HELEN McSWEENEY.